(12) United States Patent
Kang et al.

(10) Patent No.: US 8,824,064 B2
(45) Date of Patent: Sep. 2, 2014

(54) ZOOM LENS

(75) Inventors: Xiao-Tian Kang, Guangdong (CN); Jun-Jie Li, Guangdong (CN); Zi-Yuan Li, Guangdong (CN); Jian-Jun Zhang, Guangdong (CN)

(73) Assignees: Premier Image Technology(China) Ltd., Foshan (CN); Hon Hai Precision Industry Co., Ltd., New Taipei (TW)

( * ) Notice: Subject to any disclaimer, the term of this patent is extended or adjusted under 35 U.S.C. 154(b) by 169 days.

(21) Appl. No.: 13/462,830

(22) Filed: May 3, 2012

(65) Prior Publication Data

US 2012/0327519 A1 Dec. 27, 2012

(30) Foreign Application Priority Data

Jun. 21, 2011 (CN) .......................... 2011 1 0167534

(51) Int. Cl.
*G02B 15/14* (2006.01)

(52) U.S. Cl.
CPC .................................... *G02B 15/14* (2013.01)
USPC ......................................... 359/695; 359/819

(58) Field of Classification Search
CPC ................................. G02B 7/102; G02B 15/14

USPC .................. 359/695, 699–705, 819, 822, 826
See application file for complete search history.

(56) References Cited

U.S. PATENT DOCUMENTS

| | | | |
|---|---|---|---|
| 8,068,287 B2 * | 11/2011 | Sato .............................. | 359/700 |
| 8,248,709 B2 * | 8/2012 | Tsuji ............................ | 359/694 |
| 2010/0165481 A1 * | 7/2010 | Zou et al. ..................... | 359/700 |
| 2011/0102910 A1 * | 5/2011 | Yoshii et al. .................. | 359/700 |

* cited by examiner

*Primary Examiner* — Thomas K Pham
*Assistant Examiner* — Vipin Patel
(74) *Attorney, Agent, or Firm* — Novak Druce Connolly Bove + Quigg LLP (57) ABSTRACT

A zoom lens includes a fixing barrel, a cam barrel, a guide barrel, a first lens group, a second lens group, and a third lens group. The cam barrel is rotatably received in the fixing barrel. The guiding barrel is movably received in the fixing barrel and partially receives the cam barrel. The guiding barrel is moveable along an optical axis of the zoom lens following the motion of the cam barrel. The first lens group is rotatably received in the guiding barrel. The second lens group is rotatably received in the cam barrel. The first and second lens groups move along the optical axis following the rotation of the cam barrel. The third lens group is aligned with the first and second lens groups, and driven by a driver to be movably received in the fixing barrel and moveable along the optical axis of the zoom lens.

13 Claims, 10 Drawing Sheets

ZOOM LENS

BACKGROUND

1. Technical Field

The present disclosure relates to lenses and, particularly, to a zoom lens.

2. Description of Related Art

Zoom lenses commonly include a lens barrel and a number of lenses. The lenses are received within the lens barrel and arranged along the optical axis of the zoom lens as part of a photographic optical system. The lens barrel can move along the optical axis of the photographic optical system for zooming in or out when focusing. However, the structure of the lens barrels is complex and bulky, compromising compactness trends.

Therefore, it is desirable to provide a zoom lens, which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
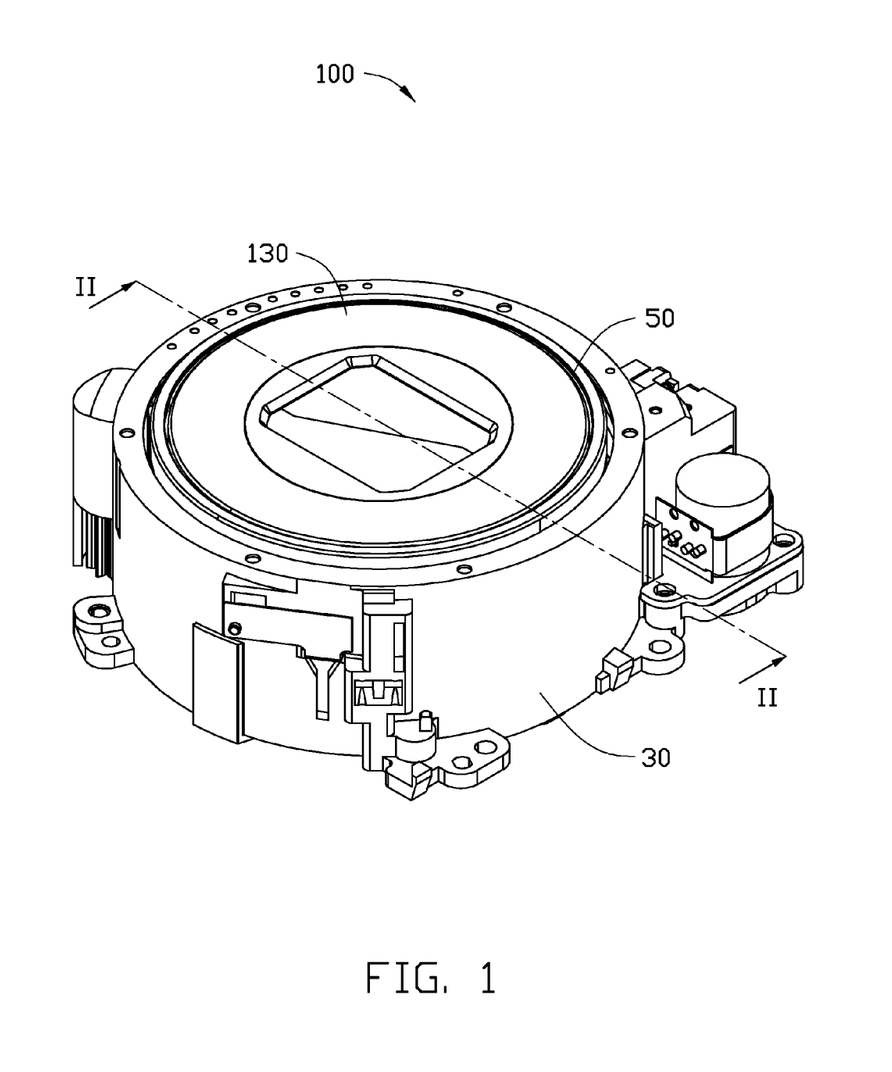
FIG. 1 is an assembled, isometric view of a zoom lens, according to an exemplary embodiment.
Figure 2:
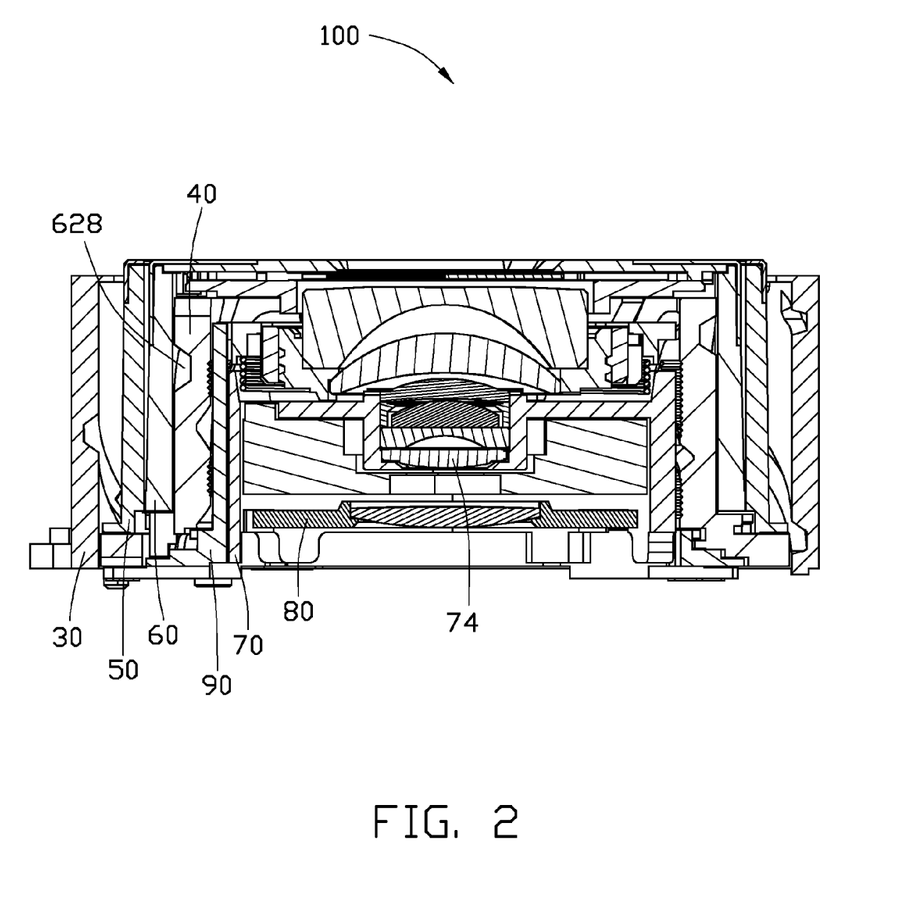
FIG. 2 is a cross-sectional view taken along line II-II of FIG. 1.
Figure 3:
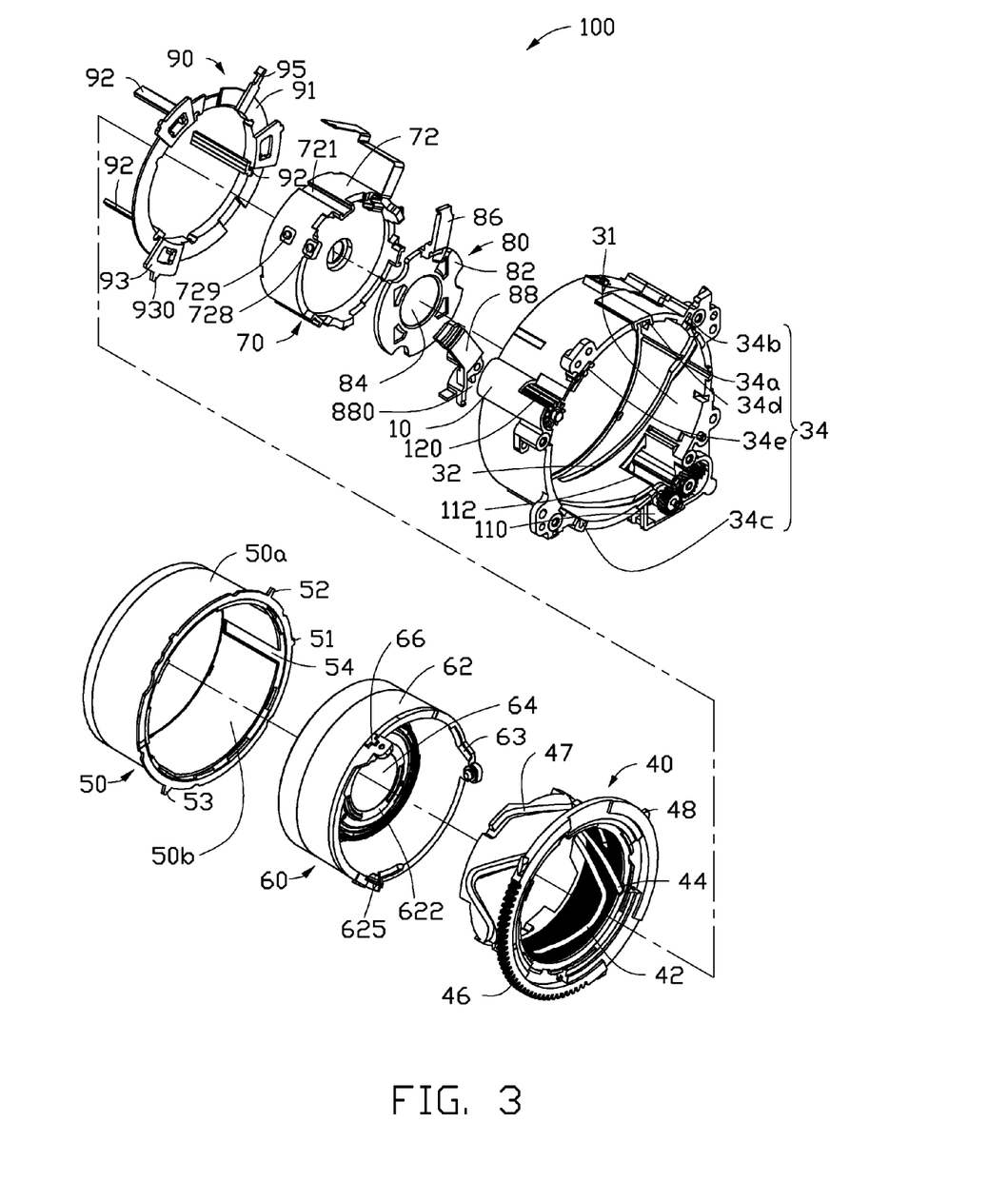
FIG. 3 is an exploded, isometric view of the zoom lens of FIG. 1, which includes a first lens assembly, a cam barrel, and a fixing barrel.

Referring to FIGS. 1-3, a zoom lens 100 for an image capturing device, according to an exemplary embodiment, includes, a fixing barrel 30, a cam barrel 40, a guiding barrel 50, a first lens group 60, a second lens group 70, a third lens group 80, and a bracket 90. The cam barrel 40 is driven by a first driving device 10 to be rotatably received in the fixing barrel 30 and moveable along the optical axis of the zoom lens 100 following the rotation thereof along the inner circumference of the fixing barrel 30. The guiding barrel 50 is movably received in the fixing barrel 30 and moveable along the optical axis of the zoom lens 100 following the motion of the cam barrel 40. The first lens group 60 is rotatably received in the guiding barrel 50. The second lens group 70 is rotatably received in the cam barrel 40. The first and second lens groups 60, 70 can move along the optical axis of the zoom lens 100 following the rotation of the cam barrel 40. The third lens group 80 is aligned with the first and second lens groups 60, 70, and driven by a second driving device 110 to be movably received in the fixing barrel 30 and moveable along the optical axis of the zoom lens 100.

Figure 4:
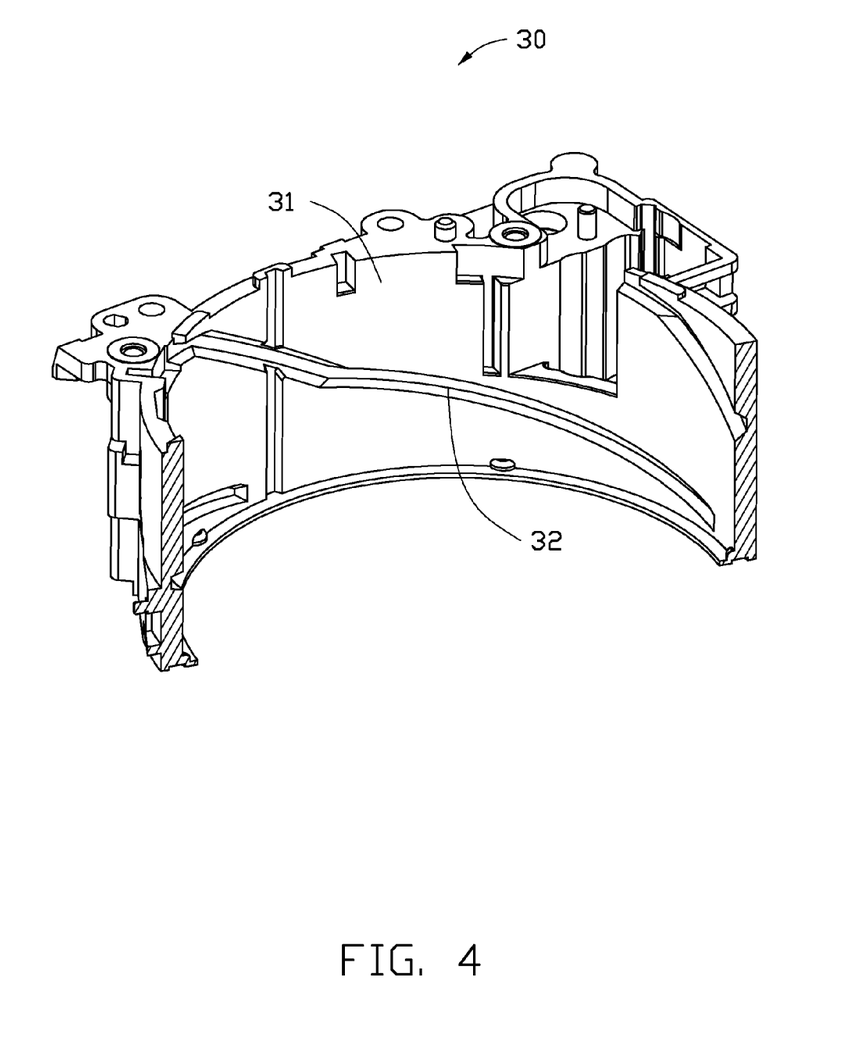
FIG. 4 is a cut-away view of the fixing barrel of FIG. 3.

Also referring to FIG. 4, the fixing barrel 30 includes an inner surface 31 which defines three cam barrel guiding recesses 32 each angled from the optical axis of the zoom lens 100, and a number of barrel guiding slots 34 parallel to the optical axis of the zoom lens 100. The barrel guiding slots 34 are separated from each other. In the embodiment, the fixing barrel 30 defines five barrel guiding slots 34: a first barrel guiding slot 34a, a second barrel guiding slot 34b, a third barrel guiding slot 34c, a fourth barrel guiding slot 34d, and a fifth barrel guiding slot 34e.

The guiding barrel 50 includes an outer sidewall 50a and a inner sidewall 50b opposite to the outer sidewall 50a. A first sliding pin 51 corresponding to the first barrel guiding slot 34a, a second sliding pin 52 corresponding to the second barrel guiding slot 34b, and a third sliding pin 53 corresponding to the third barrel guiding slot 34c extend perpendicularly outwards from an end of the outer sidewall 50a along radical directions of the guiding barrel 50, respectively. The inner sidewall 50b of the guiding barrel 50 defines three guiding channels 54. The three guiding channels 54 are all parallel to the optical axis of the zoom lens 100 and equidistantly arranged.

Figure 5:
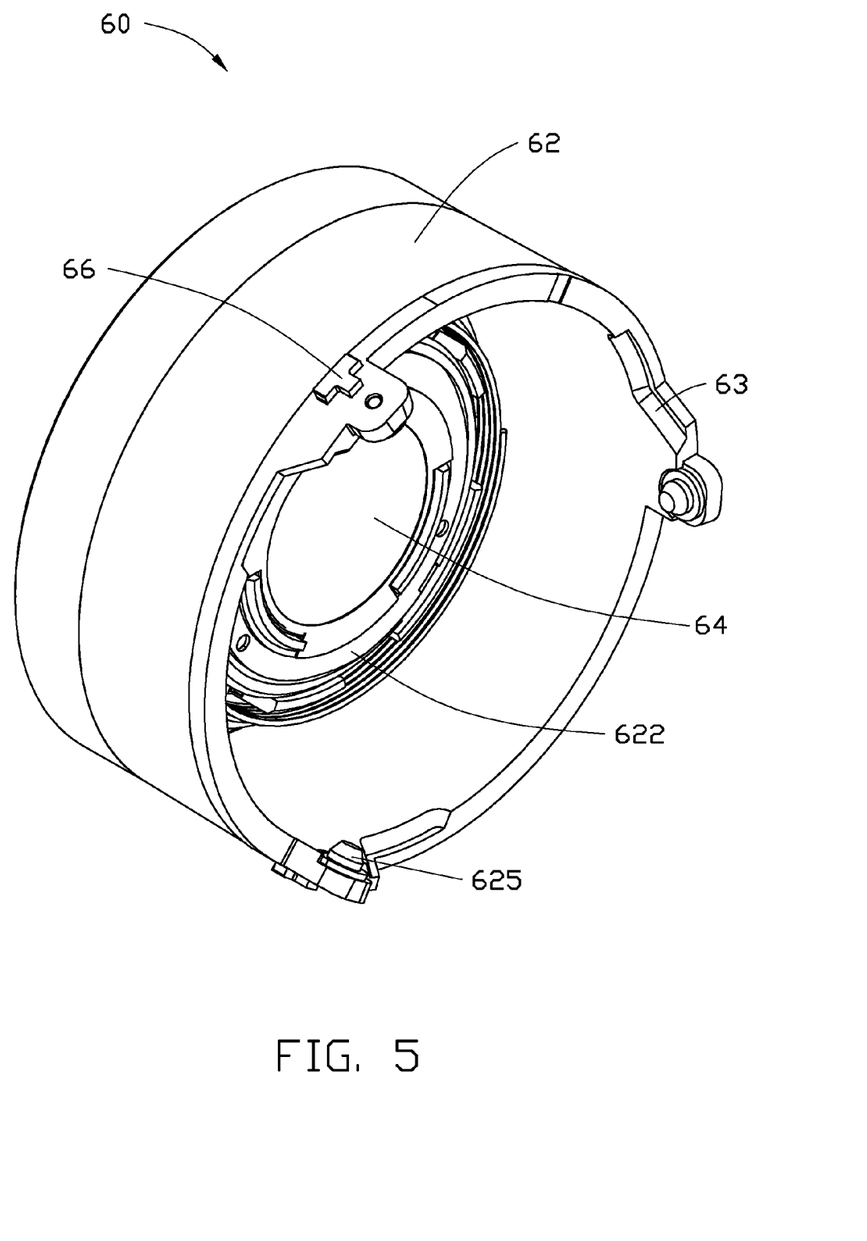
FIG. 5 is an assembled, isometric view of the first lens assembly of FIG. 3.

Referring to FIGS. 3-5, the first lens group 60 is moveably received in the guiding barrel 50. The first lens group 60 includes a first lens barrel 62 and a first lens 64 received in the first lens barrel 62. The first lens barrel 62 includes a first center portion 622 with a through hole defined thereon for receiving the first lens 64. Three projections 63 are extended upwards from a periphery of an end of the first lens barrel 62 closing to an image-end of the zoom lens 100, and equidistantly arranged. Three first cam pins 625 are respectively projected inwards from an inner surface of each of the projections 63. Three guiding blocks 66 are respectively projected outwards from an outer surface of a corresponding projection 63. Each of the guiding blocks 66 engages with a corresponding guiding channel 54 and can slide along the corresponding guiding channel 54 when the cam barrel 40 is rotated relative to the fixing barrel 30.

Figure 6:
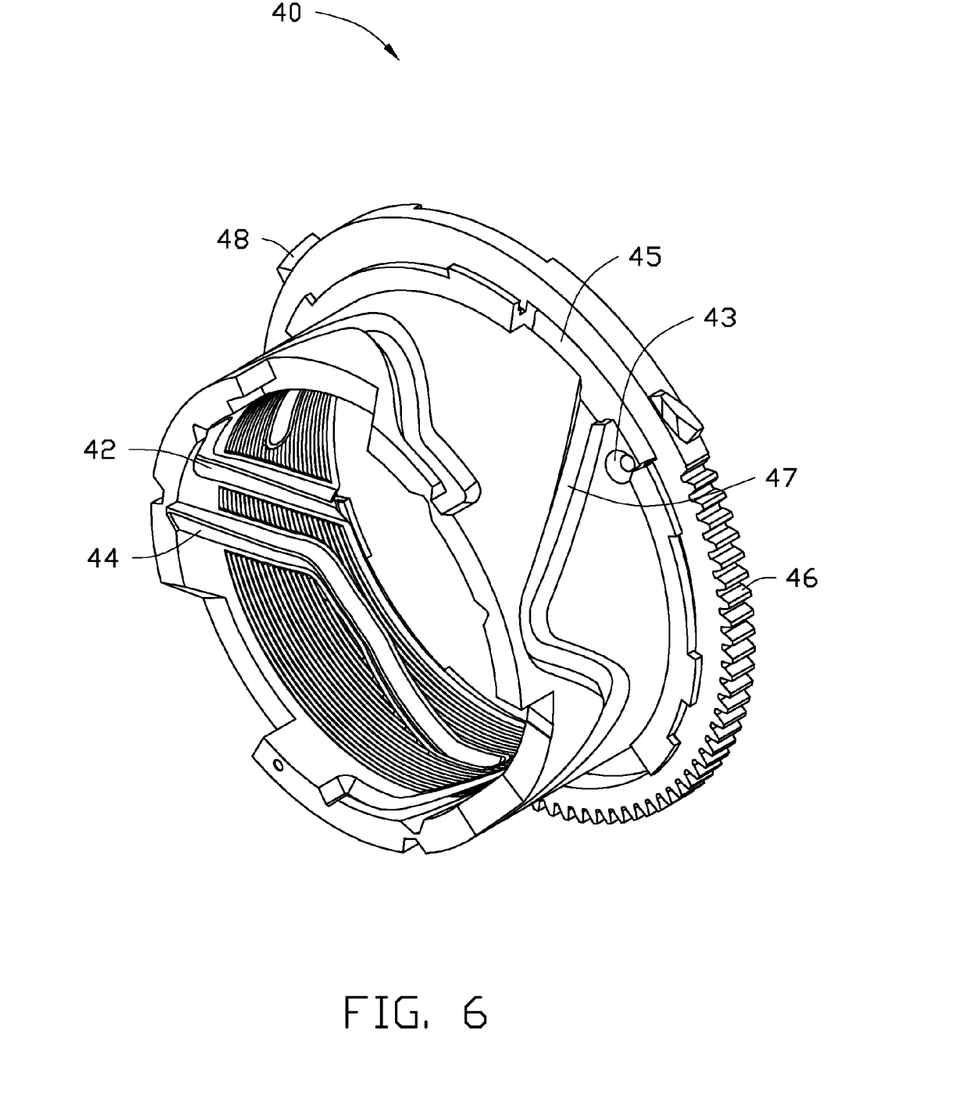
FIG. 6 is an assembled, isometric view of the cam barrel of FIG. 3.

Referring to FIGS. 3 and 6, the cam barrel 40 is rotatably received in the first lens barrel 62 and defines three first cam grooves 42 and three second cam grooves 44, evenly spaced in the circumferential direction of the cam barrel 40 and formed by cutaways in the inner sidewall of the cam barrel 40. The first cam groove 42 and the second cam groove 44 are alternately provided on the inner sidewall of the cam barrel 40 in the circumferential direction of the cam barrel 40 and extend from a rear end of the cam barrel 40 to a front end of the cam barrel 40. The cam barrel 40 includes three second cam pins 48 projecting outwards at evenly intervals, preferably at substantially 120° dispersals on the outer circumference of the cam barrel 40 near the rear end of the cam barrel 40. Each second cam pin 48 engages with a corresponding cam barrel guiding recess 32 of the fixing barrel 30 and can slide along the corresponding cam barrel guiding recess 32 when the cam barrel 40 is rotated relative to the fixing barrel 30. The cam barrel 40 further includes a toothed bar 46 formed on the outer circumference thereof between two adjacent second cam pins 48 for meshing with a driving gear 120 of the first driving device 10. The toothed bar 46 and the second cam pins 48 of the cam barrel 40 are formed on the same plane perpendicular to the optical axis of the zoom lens 100. The configuration of the cam barrel 40 greatly contributes in reducing a height of the cam barrel 40 and the overall height of the zoom lens 100 because the toothed bar 46 and the second cam pins 48 are formed on the same plane, occupying minimal area on the cam barrel 40 and effectively conserving length thereof.

The cam barrel 40 also defines three third cam grooves 47 evenly spaced in the circumferential direction of the cam barrel 40 and formed by cutaways in the outer sidewall of the cam barrel 40. The three third cam grooves 47 are alternately provided on the outer sidewall of the cam barrel 40 in the circumferential direction of the cam barrel 40 and extend from the rear end of the cam barrel 40 to the front end of the cam barrel 40. The cam barrel 40 also includes a sliding pin 43 projecting outwards from the outer sidewall of the cam barrel 40 near the rear end of the cam barrel 40 and adjacent to one of the third cam grooves 47. When the second cam pins 48 are moved along the corresponding barrel guiding recesses 32, the sliding pin 43 is resisted against by a corresponding projection 63 of the first lens group 60 until each first cam pin 625 is slid into and engaged with a corresponding third cam groove 47, then the first lens group 60 is moved along the guiding channels 54 in the guiding barrel 50.

In the embodiment, the cam barrel 40 also defines three openings 45 at the rear of outer sidewall of the cam barrel 40. Each of the openings 45 is adjacent to and communicating with a respective one of the third cam grooves 47. When the zoom lens 100 is not in a zoom state, each opening 45 receives a corresponding first cam pin 625.

Figure 7:
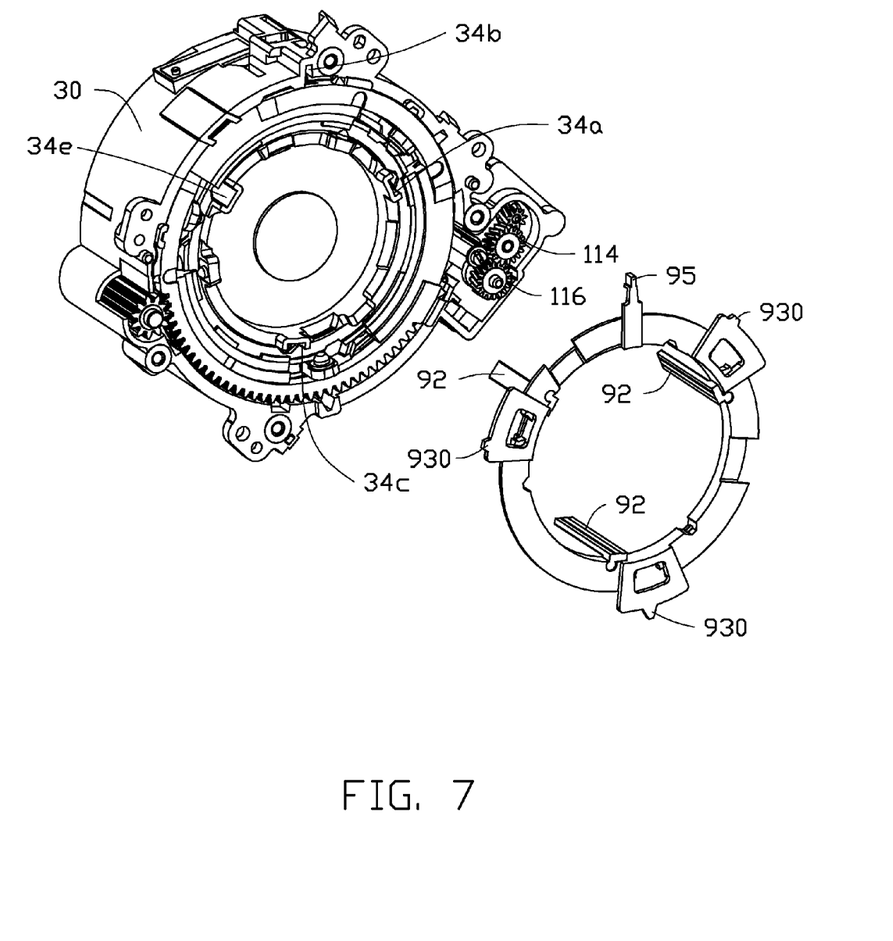
FIG. 7 is a schematic view of a part of the zoom lens of FIG. 1.
Figure 8:
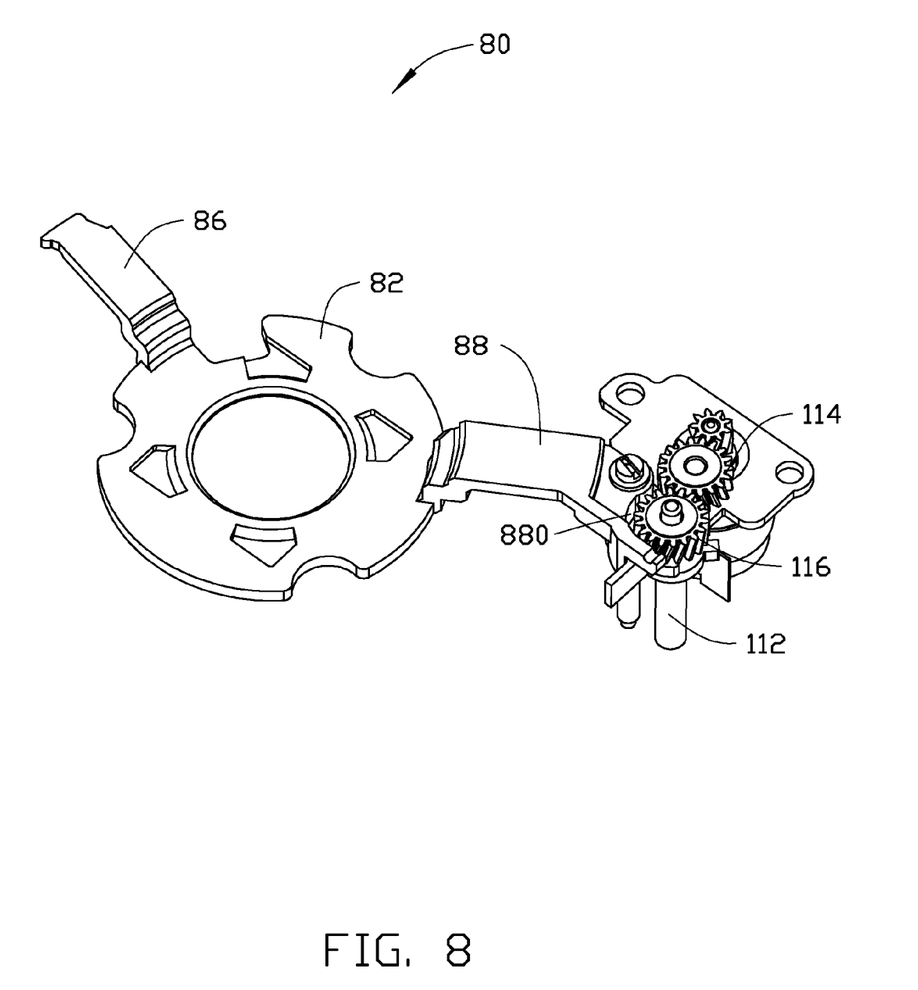
FIG. 8 is an assembled, isometric view of the engagement of third lens group with the second driving device.

Also referring to FIG. 7-8, the second lens group 70 is positioned in the cam barrel 40. The second lens group 70 includes a second lens barrel 72 and a second lens 74 received in the second lens barrel 72. Three indentions 721 are defined on the outer sidewall of the second lens barrel 72 in a direction parallel to the optical axis of the zoom lens 100. Three third cam pins 728 are projected outwards from the outer sidewall of the second lens barrel 72 near a rear end of the second lens barrel 72. Three fourth cam pins 729 are projected outwards from the outer sidewall of the second lens barrel 72, and each adjacent to a corresponding third cam pin 728. The connection line between two adjacent the third cam pin 728 and the fourth cam pin 729 is parallel to the optical axis of the zoom lens 100. Each the third cam pin 728 engages with a corresponding first cam groove 42, and each the fourth cam pin 729 engages with a corresponding second cam groove 44.

The bracket 90 includes an annular bottom plate 91, three bulging portions 92, three locating plates 93 and a guiding column 95. The three bulging portions 92 are perpendicularly extended downwards from the bottom plate 91 in a direction parallel to the optical axis of the zoom lens 100 at equal distance. The three locating plates 93 are equidistantly projected outwards from an outer sidewall of the bottom plate 91 in radical directions of the bracket 90. The guiding column 95 extends from the outer sidewall of the bottom plate 91 in a radical direction of the bracket 90 and positioned between two neighboring locating plates 93.

The bulging portions 92 are configured to respectively engage with the corresponding indentions 721 of the second lens barrel 72. Three first latching plates 930 are respectively extended outwards from the locating plates 93. The three first latching plates 930 are respectively engaged with the first barrel guiding slot 34a, the third barrel guiding slot 34c, and the fifth barrel guiding slot 34e.

When the cam barrel 40 is rotated relative to the fixing barrel 30, the bracket 90 slides along the first barrel guiding slot 34a, the third barrel guiding slot 34c, and the fifth barrel guiding slot 34e, and the third pins 728 slide in the first cam grooves 42 and the fourth cam pins 729 slide in the second cam grooves 44, as such, the second lens group 70 can move following the motion of the cam barrel 40.

The third lens group 80 is mounted in the first lens barrel 62 and aligning with the optical axis of the first and second lenses 64, 74. The third lens group 80 includes a third lens barrel 82, a third lens 84 supported on the third lens barrel 82, a guide rod 86, and an actuating rod 88. The third lens barrel 82 is supported on the guide rod 86 and the actuating rod 88. The guide rod 86 is engaged with the fourth barrel guiding slot 34d. In the embodiment, the actuating rod 88 includes a U-shaped threaded block 880. The third lens 84 and the third lens barrel 82 can be moved by the second driving device 110 along the fourth barrel guiding slot 34d.

Referring to FIGS. 1, 3, 7 and 8, the first driving device 10 is used for driving the cam barrel 40, and the second driving device 110 is used for driving the third lens group 80. The first driving device 10 includes a driving gear 120 rotatably set in the fixing barrel 30 and meshed with the toothed bar 46 to rotate the cam barrel 40. The second driving device 110 includes a driving rod 112 positioned in the U-shaped threaded block 880, a first helical gear 114 and a second helical gear 116. The second helical gear 116 is mounted on an end of the driving rod 112. The second helical gear 116 meshes with the helical gear 114 for driving the third lens group 80 to move along the driving rod 112.

The zoom lens 100 also includes a lens cover 130 which is mounted on the front end of the first lens barrel 62 of the first lens group 60 for protecting the first lens 64 from damage and contamination.

Referring to FIGS. 1, 2, 9, and 10, in use, the cam barrel 40 is rotated by the driving gear 120 of the first driving device 10 around the inner circumference of the fixing barrel 30, and simultaneously moves along the optical axis of the zoom lens 100 with respect to the fixing barrel 30 as the second cam pins 48 slide in the cam barrel guiding recesses 32 of the fixing barrel 30. Following the movement of the cam barrel 40, the guiding barrel 50 is moved along the optical axis of the zoom lens 100 with respect to the fixing barrel 30 by the first sliding pin 51, the second sliding pin 52, and the third sliding pin 53 respectively sliding in the first guiding barrel guiding slot 34a, the second guiding barrel guiding slot 34b, and the third guiding barrel guiding slot 34c. Thus, the guiding barrel 50 can only be moved along the optical axis of the zoom lens 100, but not rotated with respect to the fixing barrel 30.

Figure 9:
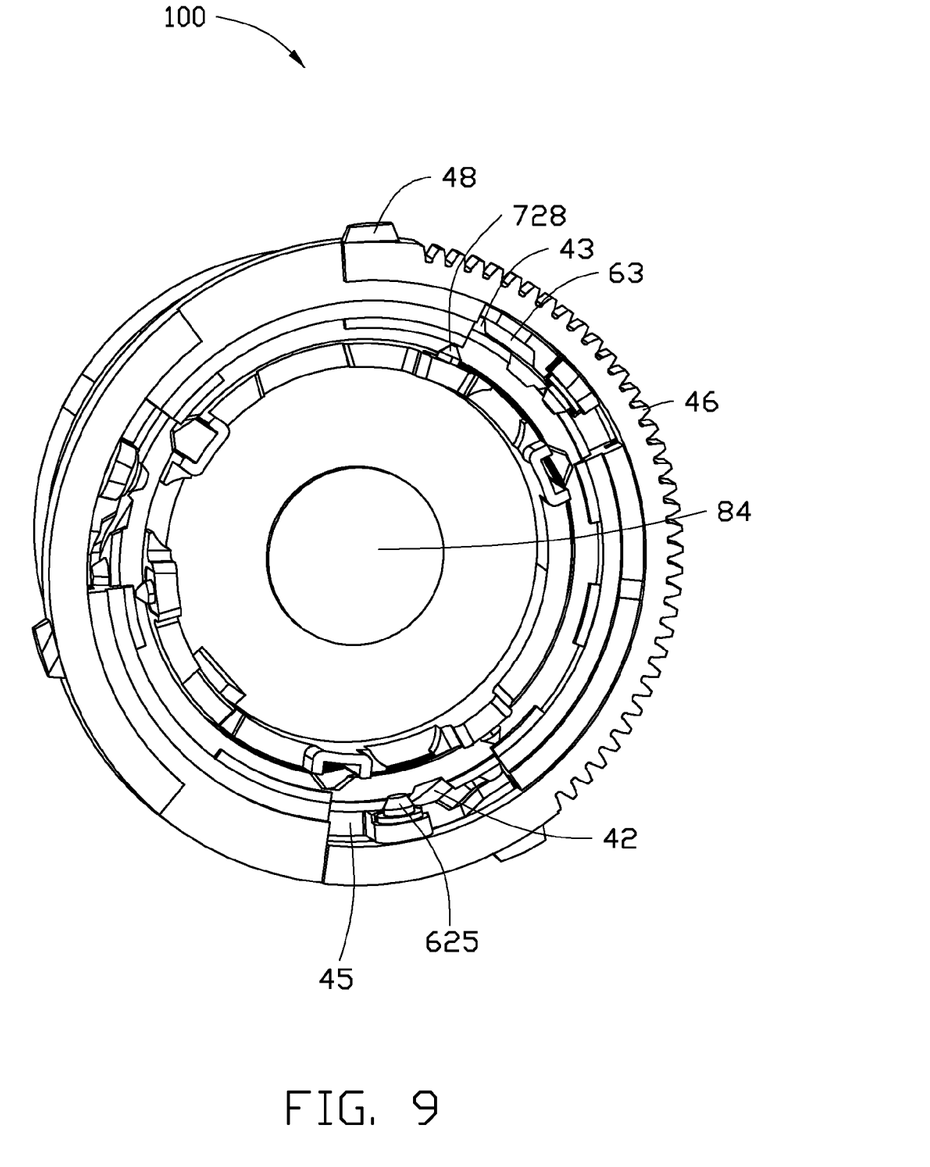
FIG. 9 is a schematic view of the zoom lens of FIG. 1 which is in a contracted state.
Figure 10:
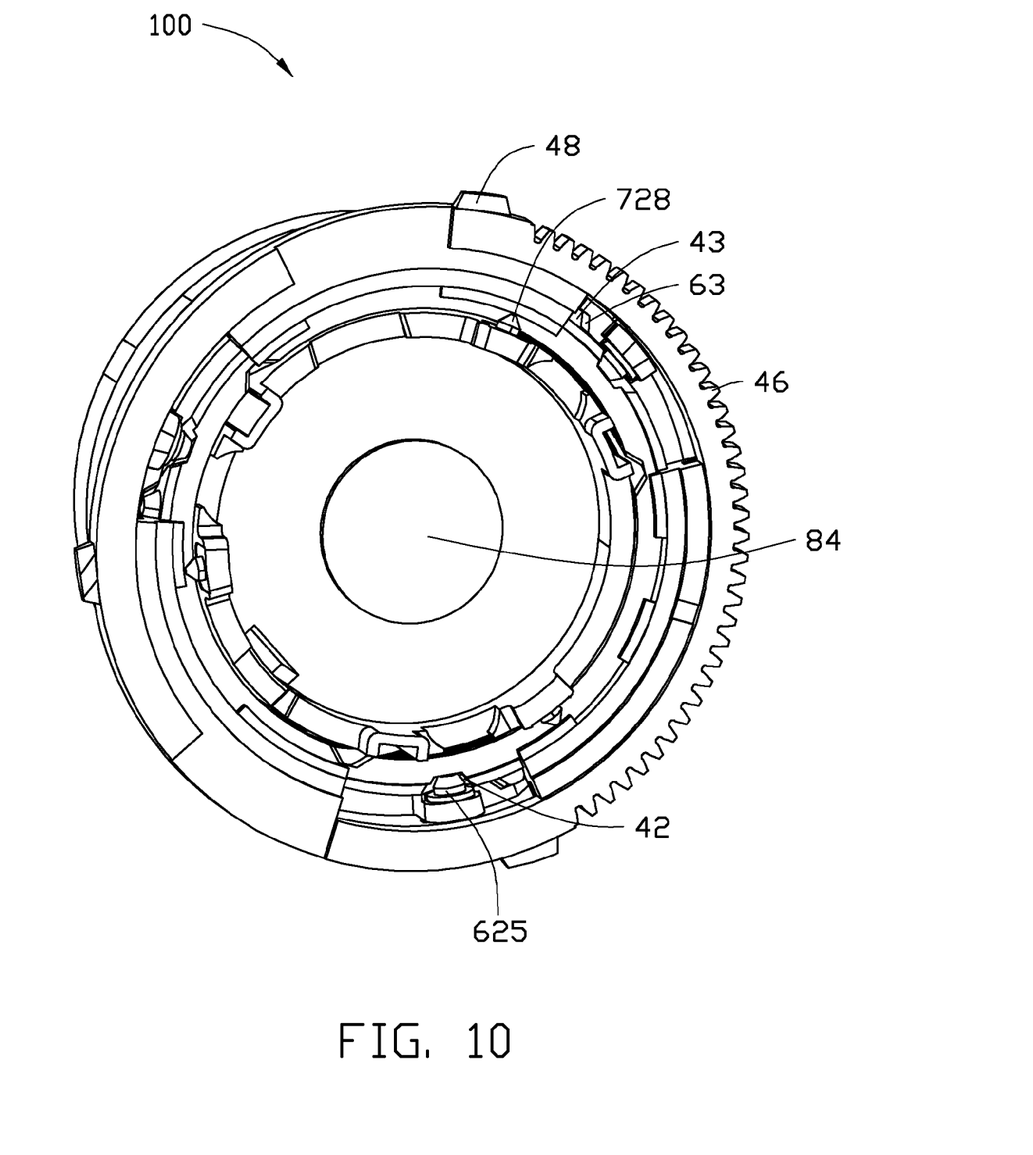
FIG. 10 is a schematic view of the zoom lens of FIG. 1 which is in an extended state.

When the cam barrel 40 is rotated and the guiding barrel 50 stops to slide, the sliding pin 43 is resisted against by a corresponding projection 63 of the first lens group 60 until each first cam pin 625 is slid into and engaged with a corresponding third cam groove 47. The first lens group 60 is moved along the guiding channels 54, to carry out zooming function. The guiding column 95 is slid in the second barrel guiding slot 34b, the third cam pins 728 are slid in the first cam grooves 42 and the fourth cam pins 729 are slid the second cam groove 44. As such, the second lens group 70 can move along the optical axis of the zoom lens 100, to carry out zooming function. After zooming, the third lens group 80 is driven by the second driving device 110 to carry out focusing function.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A zoom lens comprising:
a fixing barrel;
a cam barrel rotatably received in the fixing barrel;

a guiding barrel movably received in the fixing barrel and partially receiving the cam barrel, the guiding barrel being moveable along an optical axis of the zoom lens following the motion of the cam barrel;

a first lens group received in the guiding barrel;

a second lens group rotatably received in the cam barrel, the first and second lens groups moving along the optical axis of the zoom lens when the cam barrel rotates around the optical axis of the zoom lens in the fixing barrel;

a third lens group aligned with the first and second lens groups, and movably received in the fixing barrel and moveable along the optical axis of the zoom lens; and a bracket; wherein the fixing barrel comprises an inner surface which defines three cam barrel guiding recesses, each of the cam barrel guiding recesses is angled from the optical axis of the zoom lens, the cam barrel comprises three first cam pins projecting outwards at evenly intervals on an outer sidewall of the first lens barrel near a rear end of the cam barrel, each of the cam pins engages with a corresponding cam barrel guiding recess of the fixing barrel and slides along the corresponding cam barrel guiding recess when the cam barrel is rotated relative to the fixing barrel, the fixing barrel comprises a first barrel guiding slot, a second barrel guiding slot, and a third barrel guiding slot in its inner surface, the first barrel guiding slot, the second barrel guiding slot, and the third barrel guiding slot are parallel to the optical axis of the zoom lens, the guiding barrel comprises an outer sidewall, an inner sidewall opposite to the inner sidewall, a first sliding pin received in the first barrel guiding slot, a second sliding pin received in the second barrel guiding slot, and a third sliding pin received in the third barrel guiding slot, all of the first, second and third sliding pins respectively extend outwards from an end of the outer sidewall, the guiding barrel is capable of sliding along the optical axis of the zoom lens with respect to the fixing barrel by the first sliding pin, the second sliding pin, and the third sliding pin respectively sliding in the first barrel guiding slot, the second barrel guiding slot, and the third barrel guiding slot, the second lens group comprises a second lens barrel and a second lens received in the second lens barrel, the second lens barrel comprises three third cam pins and three fourth cam pins, each the third and fourth cam pins projects outwards from an outer sidewall of the second lens barrel, the cam barrel defines three second cam grooves and three third cam grooves in its inner sidewall, the cam barrel comprises a front end opposite to the rear end, the second cam grooves and the third cam grooves extend from the rear end to the front end and are angled from the optical axis of the zoom lens, the second cam grooves receive the third cam pin, the third cam grooves receive the fourth cam pin, when the cam barrel is rotated related relative to the fixing barrel, the third cam pins slide in a corresponding second cam groove and the fourth cam pins slide in a corresponding third cam groove, the bracket comprises an annular bottom plate, three bulging portions, three locating plates, three first latching plates and a guiding column, the three bulging portions are perpendicularly extended downwards from the bottom plate in a direction parallel to the optical axis of the zoom lens, the three locating plates are projected outwards from an outer sidewall of the bottom plate in radical directions of the bracket, the guiding column extends from the outer sidewall of the bottom plate in a radical direction of the bracket and is positioned between two neighboring locating plates, the second lens barrel defines three indentions in its outer sidewall in a direction parallel to the optical axis of the zoom lens, each of the bulging portions is received in a corresponding indention, each of the three first latching plates extends outwards from a corresponding locating plate, the fixing barrel also defines a fourth barrel guiding slot, and a fifth barrel guiding slot, the three first latching plates are respectively engaged with the first barrel guiding slot, the third barrel guiding slot, and the fifth barrel guiding slot, and the guiding column is engaged with the second barrel guiding slot.

2. The zoom lens in claim 1, wherein the cam barrel further comprises a toothed bar positioned on the outer sidewall of the cam barrel between two adjacent first cam pins for meshing with a driving gear.

3. The zoom lens in claim 1, wherein the first lens group comprises a first lens barrel and a first lens received in the first lens barrel, the first lens barrel comprises three projections and three second cam pins, the three projections extend from an end of the first lens barrel along a direction parallel to the optical axis of the zoom lens, each of the second cam pins projects inwards from an inner surface of each of the projections, the cam barrel defines three openings at the rear end thereof, and three first cam grooves on its outer sidewall, each of the three first cam grooves communicates with a respective one of the openings, the cam barrel comprises a sliding pin projecting outwards from its outer sidewall near its rear end, the sliding pin is positioned adjacent to one of the first cam grooves, when each first cam pin moves along the corresponding cam barrel guiding recess, the sliding pin is resisted against by a corresponding projection until each second cam pin is slid into and engaged with a corresponding first cam groove and each opening receives a respective projection.

4. The zoom lens in claim 3, wherein the inner sidewall of the guiding barrel defines three guiding channels parallel to the optical axis of the zoom lens, the first lens barrel comprises three guiding blocks, each of the guiding blocks projects outwards from an outer sidewall of a corresponding projection and engages with a corresponding guiding channel, the guiding blocks slide along the corresponding guiding channels when the cam barrel is rotated relative to the fixing barrel.

5. The zoom lens in claim 3, further comprising a lens cover, wherein the lens cover is mounted on the first lens barrel for protecting the first lens from damage and contamination.

6. The zoom lens in claim 1, wherein the connection line between the two adjacent third cam pin and the fourth cam pin is parallel to the optical axis of the zoom lens.

7. The zoom lens in claim 1, wherein the third lens group comprises a third lens barrel, and a third lens supported on the third lens barrel.

8. The zoom lens in claim 7, wherein the zoom lens comprises a first driving device for driving the cam barrel, and a second driving device for driving the third lens group.

9. The zoom lens in claim 8, wherein the cam barrel further comprise a toothed bar positioned on its outer sidewall, the first driving device comprises a driving gear meshed with the toothed bar to rotate the cam barrel.

10. The zoom lens in claim 8, wherein the third lens group comprises a guide rod slid in the fourth barrel guiding slot, and an actuating rod, the third lens barrel is slidably supported on the guide rod and the actuating rod, the actuating rod comprises a U-shaped threaded block, the second driving device comprises a driving rod mounted in the U-shaped threaded block, a first helical gear and a second helical gear, the second helical gear is mounted on a end of the driving rod, the second helical gear meshes with the helical gear for driving the third lens group to move along the driving rod.

11. A zoom lens comprising:

a fixing barrel;

a cam barrel rotatably received in the fixing barrel;

a guiding barrel movably received in the fixing barrel and partially receiving the cam barrel, the guiding barrel being moveable along an optical axis of the zoom lens following the motion of the cam barrel;

a first lens group received in the guiding barrel, the second lens group comprising a first lens barrel and a first lens received in the second lens barrel;

a second lens group rotatably received in the cam barrel, the first and second lens groups moving along the optical axis of the zoom lens when the cam barrel rotates around the optical axis of the zoom lens in the fixing barrel, the second lens group comprises a second lens barrel and a second lens received in the second lens barrel;

a third lens group aligned with the first and second lens groups, and movably received in the fixing barrel and moveable along the optical axis of the zoom lens; and a bracket comprising an annular bottom plate, three bulging portions, three locating plates, three first latching plates and a guiding column, wherein the three bulging portions are perpendicularly extended downwards from the bottom plate in a direction parallel to the optical axis of the zoom lens, the three locating plates are projected outwards from an outer sidewall of the bottom plate in radical directions of the bracket, the guiding column extends from the outer sidewall of the bottom plate in a radical direction of the bracket and is positioned between two neighboring locating plates, the second lens barrel defines three indentions in its outer sidewall in a direction parallel to the optical axis of the zoom lens, each of the bulging portions is received in a corresponding indention, each of the three first latching plates extends outwards from a corresponding locating plate, the fixing barrel also defines a fourth barrel guiding slot, and a fifth barrel guiding slot, the three first latching plates are respectively engaged with the first barrel guiding slot, the third barrel guiding slot, and the fifth barrel guiding slot, and the guiding column is engaged with the second barrel guiding slot.

12. The zoom lens in claim 11, wherein the fixing barrel comprises an inner surface which defines three cam barrel guiding recesses, each of the cam barrel guiding recesses is angled from the optical axis of the zoom lens, the cam barrel comprises three first cam pins projecting outwards at evenly intervals on an outer sidewall of the first lens barrel near a rear end of the cam barrel, each of the cam pins engages with a corresponding cam barrel guiding recess of the fixing barrel and slides along the corresponding cam barrel guiding recess when the cam barrel is rotated relative to the fixing barrel.

13. The zoom lens in claim 12, wherein the cam barrel further comprises a toothed bar positioned on the outer sidewall of the cam barrel between two adjacent first cam pins for meshing with a driving gear.

* * * * *